US012643129B1

(12) United States Patent
Wang

(10) Patent No.: US 12,643,129 B1
(45) Date of Patent: Jun. 2, 2026

(54) PUSHBLOCK PAD CLEANER

(71) Applicant: Henry Wang, Winter Springs, FL (US)

(72) Inventor: Henry Wang, Winter Springs, FL (US)

( * ) Notice: Subject to any disclaimer, the term of this patent is extended or adjusted under 35 U.S.C. 154(b) by 0 days.

(21) Appl. No.: 19/350,421

(22) Filed: Oct. 6, 2025

(51) Int. Cl.
*B08B 1/10* (2024.01)
*B08B 1/20* (2024.01)
*B27B 25/10* (2006.01)

(52) U.S. Cl.
CPC .................. *B08B 1/10* (2024.01); *B08B 1/20* (2024.01); *B27B 25/10* (2013.01)

(58) Field of Classification Search
CPC .. B08B 1/10; B08B 1/20; B27B 25/10; B27B 27/10; B27B 27/033; A47L 13/44; A47L 13/46; A47L 13/42; A47L 13/34; A47L 13/16; A47L 13/10; A47L 13/07
USPC ........ 15/231, 229.11, 229.12, 229.13; 83/42, 83/473.1, 436.2, 436.7, 477.2, 471.3, 440, 83/466
See application file for complete search history.

(56) References Cited

U.S. PATENT DOCUMENTS

| | | | |
|---|---|---|---|
| 3,631,560 A | 1/1972 | Atkins | |
| D356,892 S | 4/1995 | Ricci | |
| 5,437,075 A | 8/1995 | Peake | |
| 6,032,316 A | 3/2000 | Peake et al. | |
| 6,363,567 B1 | 4/2002 | Woodward | |
| 8,607,397 B1 | 12/2013 | Caver | |
| 10,646,093 B2 | 5/2020 | Kamody et al. | |
| 12,162,435 B1 * | 12/2024 | Thomas | A47L 23/26 |
| 2005/0115009 A1 | 6/2005 | Jackson | |
| 2006/0246830 A1 * | 11/2006 | Kirschhoffer | B24D 15/023 451/514 |
| 2008/0092318 A1 | 4/2008 | Sharpe | |
| 2009/0113649 A1 | 5/2009 | Drumm | |

* cited by examiner

*Primary Examiner* — Monica S Carter
*Assistant Examiner* — Caleb Andrew Holizna
(74) *Attorney, Agent, or Firm* — Wolter Van Dyke Davis, PLLC; Robert L. Wolter; Patrick Herron

(57) ABSTRACT

A pushblock pad cleaner (100), including: a body (102) having a body central section (102C) configured to receive a scour pad thereon and body ends (102A, 102B) disposed opposite each other about the body central section; at least one clamp assembly (120A, 120B), each disposed at a respective body end and each configured to secure a respective end of the scour pad and thereby hold a central region of the scour pad atop the body central section; a guide support (110G) disposed at one body end of the body ends; and a second support (110S) at another end of the body ends. The guide support is configured to register with a table saw slot to enable the guide support to slide along a long axis of the table saw slot while the second support slides along a work surface of the table saw.

15 Claims, 12 Drawing Sheets

PUSHBLOCK PAD CLEANER

FIELD OF THE INVENTION

The invention relates to an apparatus suitable for cleaning a resilient pad of a woodworking pushblock.

BRIEF DESCRIPTION OF THE DRAWINGS

The invention is explained in the following description in view of the drawings that show.

DETAILED DESCRIPTION OF THE INVENTION

Various embodiments may be understood more readily by reference to the following detailed description. Unless defined otherwise, all technical and scientific terms used herein have the same meaning as commonly understood by one of ordinary skill in the art to which this disclosure belongs.

Pushblocks of various designs to control a workpiece during table saw operations are known in the art. Some of these pushblocks include pads on their underside to increase friction between the pushblock and the workpiece. The Inventor has recognized that certain pad materials tend to accumulate dust, and this dust reduces friction between the pad and the workpiece. Such pads may be composed of, for example, a thermoplastic elastomer. Examples include TPE (Thermo-Plastic Elastomer), TPU (Thermo-Plastic Urethane), TPR (Thermo-Plastic Rubber), Urethane Micro-Cellular Foam and similar compressible high friction materials.

The Inventor has devised a unique and innovative pushblock pad cleaner that removes this dust and thereby returns the friction between the pad and the workpiece to its original level. In addition, the pushblock pad cleaner can readily be incorporated into the work environment associated with the table saw. This ensures easy access to the pushblock pad cleaner when necessary, which, in turn, enables the pushblock to maintain a consistently high friction level. Consistent performance and high pushblock friction contribute to a safer operating experience.

Figure 1A:
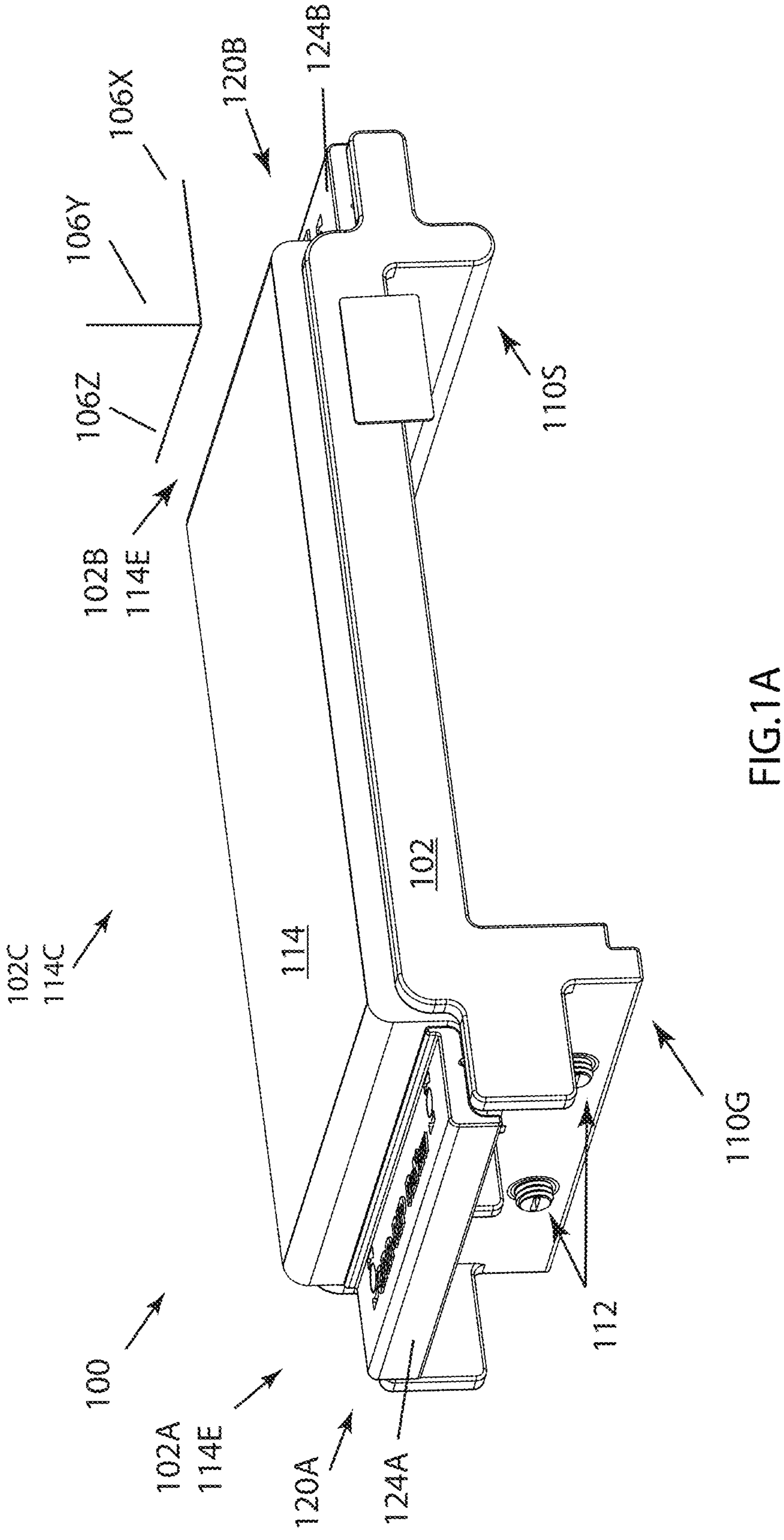
FIG. 1A is a perspective view of an example embodiment of a pushblock pad cleaner disclosed herein.
Figure 1B:
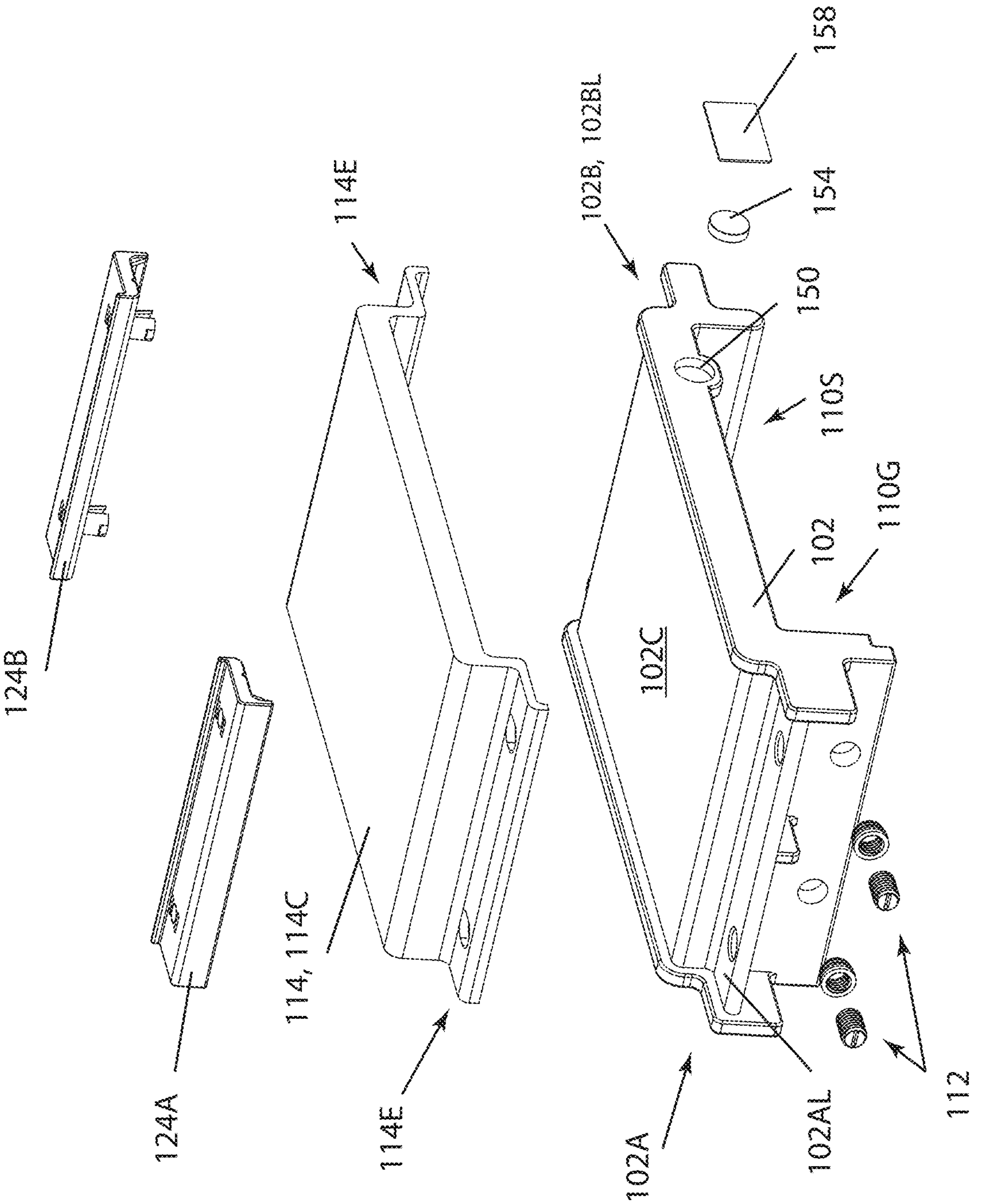
FIG. 1B is an exploded view of the pushblock pad cleaner of FIG. 1A.

FIG. 1 is a perspective view of an example embodiment of a pushblock pad cleaner 100 disclosed herein. FIG. 1B is an exploded view of the pushblock pad cleaner 100.

The pushblock pad cleaner 100 includes a body 102 that includes a body central section 102C and body ends 102A, 102B disposed opposite each other about the body central section 102C.

The body ends 102A, 102B and the body central section 102C extend serially along an X-axis 106X (e.g., a long/length axis of the body 102). The pushblock pad cleaner 100 also extends laterally along a Z-axis 106Z (e.g., a lateral/width axis that is perpendicular to the X-axis 106X) and vertically along a Y-axis 106Y (e.g., a vertical/height axis that is perpendicular to both the X-axis 106X and the Z-axis 106Z).

The body 102 further includes a guide support 110G disposed at body end 102A and a second support 110S at body end 102B. The guide support 110G is optionally longer along the Y-axis 106Y than the second support 110S. This allows for a tilt angle of the body central section 102C (and a scour pad disposed thereon) when the supports 110 are disposed on a flat, horizontal surface (e.g., a table saw work surface). The tilt angle may be, for example, 5° to 10° down from the guide support 110G to the second support 110S.

The guide support 110G is configured to register with a table saw slot to enable the guide support 110G to slide along a long axis of the table saw slot while the second support 110S slides along a work surface of the table saw. To ensure a snug but sliding fit between the guide support 110G and the saw table slot, the guide support 110G further includes adjustment elements 112, (e.g., grub screws and cooperating threaded inserts or the like disposed in respective holes in the body 102), configured to remove slack between the guide support 110G and the table saw slot.

The pushblock pad cleaner 100 further includes a scour pad 114 (e.g., a 3M™ Scotch-Brite™ scour pad or the like) having a pad central region 1140 disposed atop the body central section 102C and pad ends 114E secured to the body 102 at the body ends 102A, 106B.

Each pad end 110E is secured to the body 102 via a respective clamp assembly 120A, 120B disposed at respective ends 102A, 102B of the body 102. By securing the pad ends 110E in this manner, the clamp assemblies 120A, 120B ensure the pad central region 114C remains disposed atop the body central section 102C during use.

Each clamp assembly 120A, 120B includes a respective securing plate 124A, 124B and a respective ledge 102AL, 102BL of each body end 102A, 102B. The ledges 102AL, 102BL may be lowered relative to the body central section 102C to ensure the pad central region 114C stands above the securing plates 124A, 124B. Being so lowered ensured the securing plates 124A, 124B do not interfere with a swiping action of the pushblock across the pad central region 114C.

Optionally, the body central section 102C, the ledges 102AL, 102BL, the guide support 110G, and the second support 110S are all part of a unipartite body. The unipartite body may be formed by a 3D printing process, a molding process, or the like.

The pushblock pad cleaner 100 optionally further comprises a magnet recess 150 configured to receive a magnet 154 and optionally includes a magnetic element 158 (e.g., a ferrous element) with an optional adhesive thereon (not shown). When the guide support 118G is disposed in the table saw slot, the magnet 154 is configured to be disposed above the work surface. The magnetic element 158 can be secured to a discrete item such as a spray bottle holding a solvent (e.g., isopropyl alcohol) at a level that corresponds to a level of the magnet 154. The magnet 154 holds the magnetic element 158 and bottle attached thereto so that the spray bottle moves along the work surface of the table saw with the pushblock pad cleaner 100 as the pushblock pad cleaner 100 moves in the table saw slot. The solvent in the spray bottle is therefore always close at hand so that the scour pad 114 can readily be doused with solvent to aid in the cleaning the pad of the pushblock.

Figure 3:
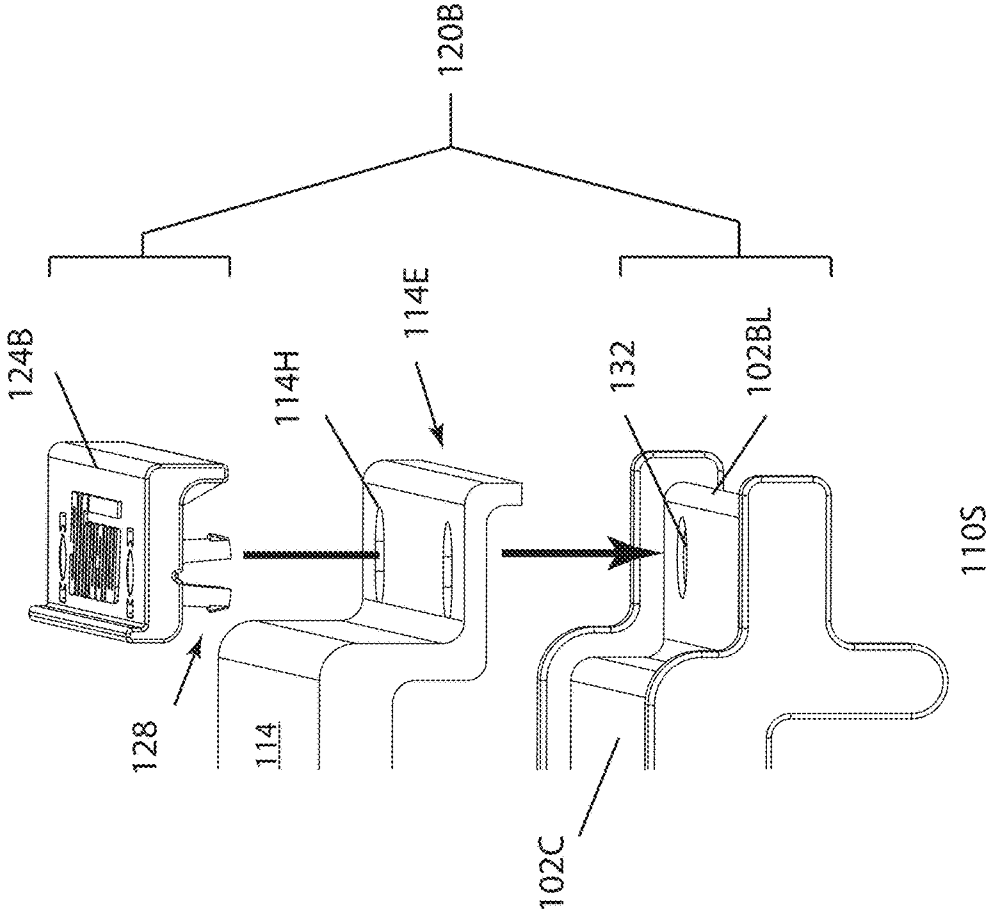
FIG. 3 is a partial perspective view showing assembly of the pushblock pad cleaner of FIG. 1A.
Figure 2:
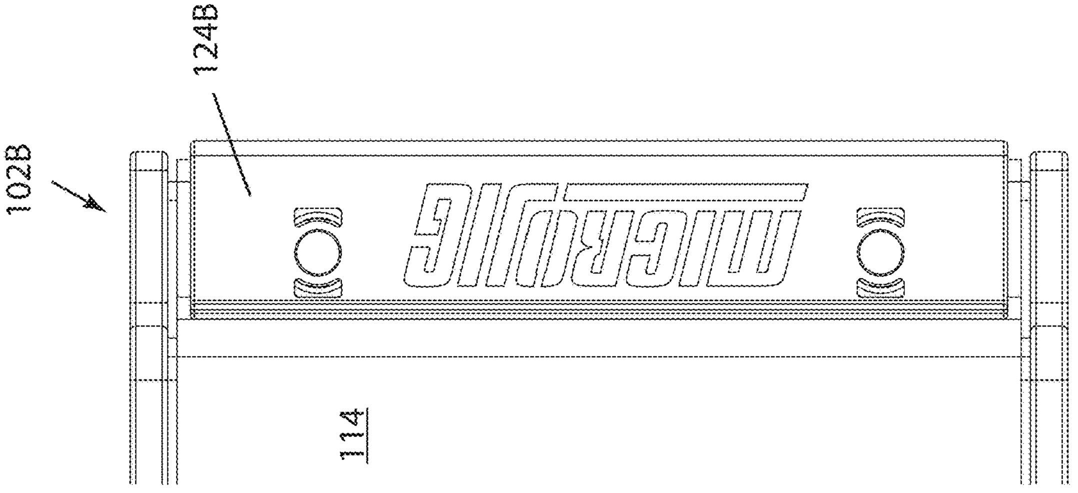
FIG. 2 is a partial top view of an end of the pushblock pad cleaner of FIG. 1A.

FIG. 2 is a partial top view of a body end 102B of the pushblock pad cleaner 100. FIG. 3 is a partial perspective view showing assembly of the pushblock pad cleaner 100. Clamp assembly 120B is detailed below. Clamp assembly 120A may be identical to clamp assembly 120B, it may differ slightly or wholly from clamp assembly 120A.

The securing plate 124B includes one or more resilient retaining clips 128, each configured to (optionally) pass through a respective hole 114H in the scour pad 114 and then through a respective through-hole 132 in the ledge 102BL. Once the resilient retaining clip 128 passes sufficiently far through the respective through-hole 132, the resilient retaining clip 128 snaps into place. This locks the securing plate 124B to the ledge 102BL and clamps the pad end 114E between the securing plate 124B and the ledge 102BL.

Figure 4B:
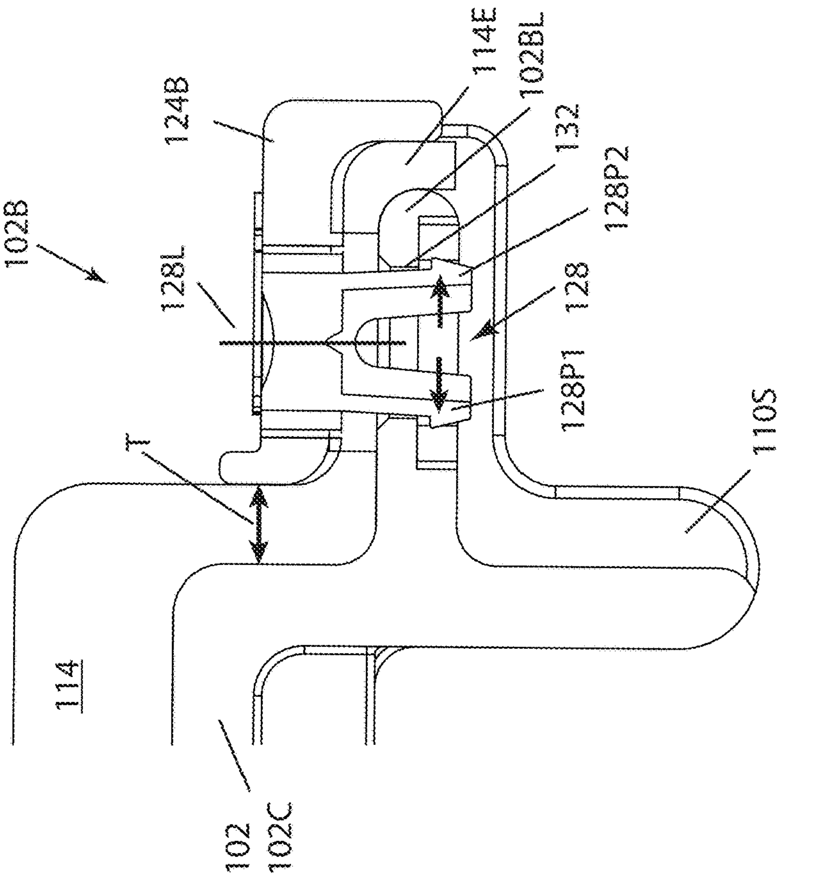
FIG. 4B is a sectional view along line 4B-4B shown in FIG. 4A.
Figure 4A:
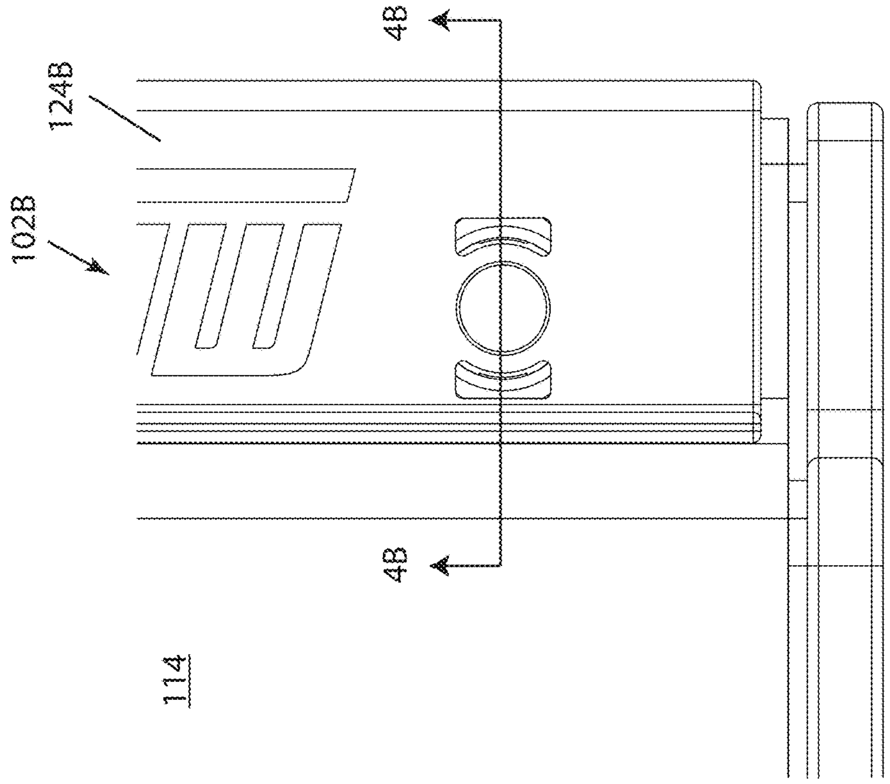
FIG. 4A is a partial top view of the end of the pushblock pad cleaner of FIG. 1A.
Figure 4C:
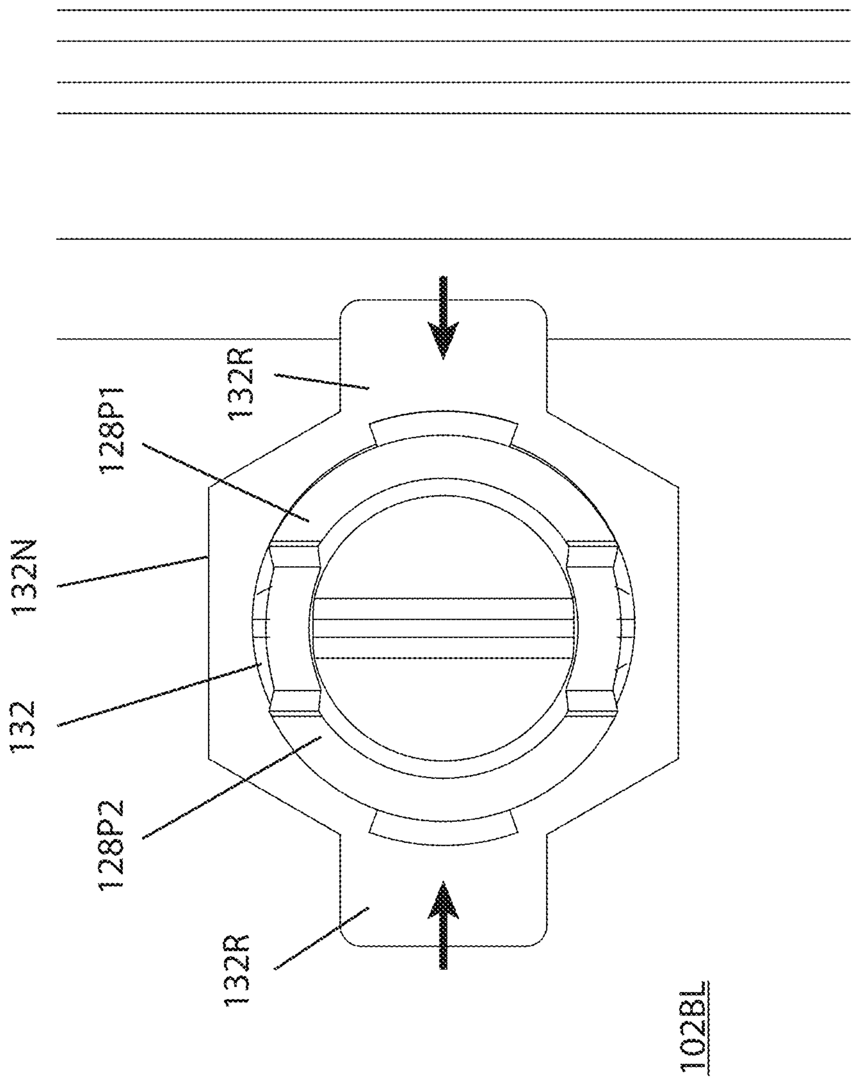
FIG. 4C is a partial bottom view of the end of the pushblock pad cleaner of FIG. 4A.

FIG. 4A is a partial top view of the body end 102B of the pushblock pad cleaner 100. FIG. 4B is a sectional view along line 4B-4B shown in FIG. 4A. FIG. 4C is a partial bottom view of the body end 102B of the pushblock pad cleaner 100. As can best be seen in FIG. 4B, once the resilient retaining clip 128 passes sufficiently through the through-hole 132, its prongs 128P1, 128P2 snap radially outward (relative to a long axis 128L of the resilient retaining clip 128) as shown by the arrows and hook under the ledge 102BL to retain the securing plate 124B in place.

An underside of the through-hole 132, (e.g., on a side of the ledge 102BL opposite the securing plate 124B), optionally includes relief notches 132R that allow for a tool (e.g., needle nose pliers or the like) to be placed adjacent the prongs 128P1, 128P2 to squeeze the prongs together (radially inward with respect to the long axis 128L). Upon sufficient squeezing together, the prongs 128P1, 128P2 release from the ledge, thereby allowing for removal of the securing plate 124B from the ledge 102BL.

Figure 5B:
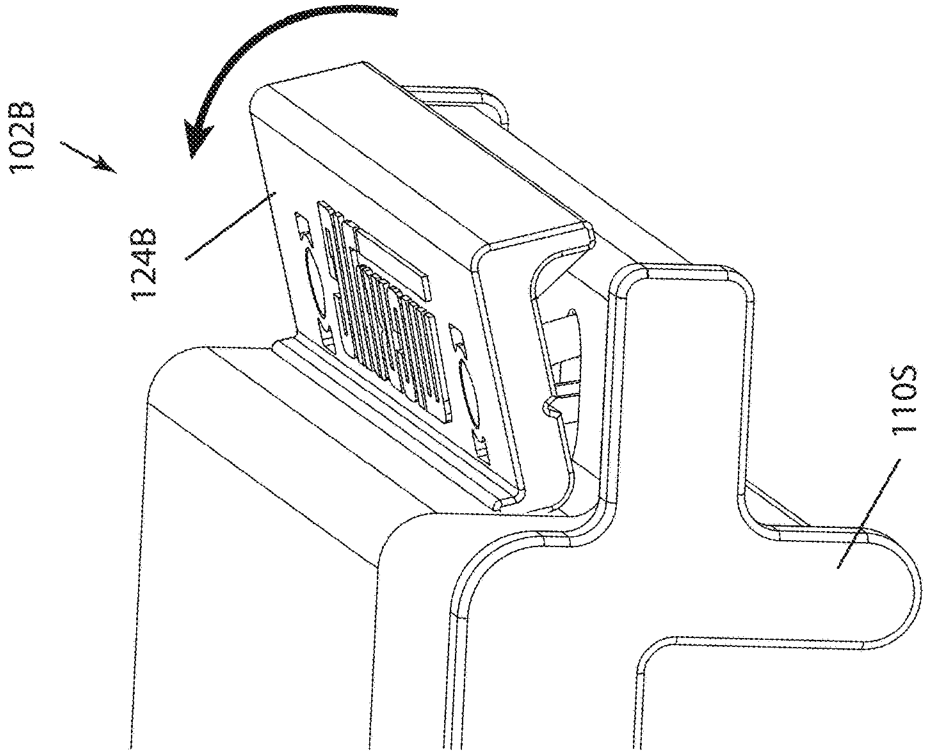
FIG. 5A and FIG. 5B are partial perspective views showing disassembly of the pushblock pad cleaner of FIG. 1A.
Figure 5A:
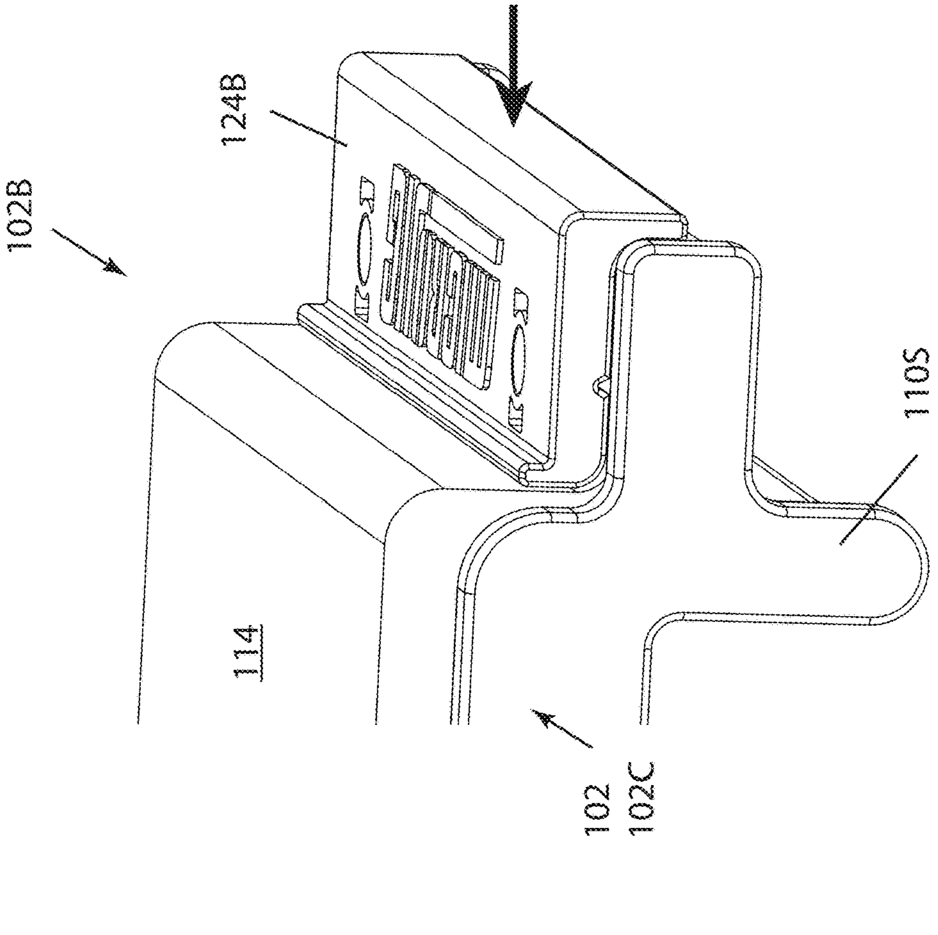

FIG. 5A and FIG. 5B are partial perspective views showing an alternate way to disassemble the pushblock pad cleaner 100. As can be seen in FIG. 4B, there is a sufficient thickness T of the scour pad 114 between the body 102 and the securing plate 124B to allow the movement of the securing plate 124B toward the body central section 102C as indicated by the arrow in FIG. 5A when an external force is applied. This movement is against a resilience of the resilient retaining clip 128 and flexes the prong 128P1 toward the long axis 128L until the opposite prong 128P2 is free of the ledge. At this point, the securing plate 124B can be rotated as shown by the arrow in FIG. 5B and thereby freed from the ledge 102BL.

Figure 6B:
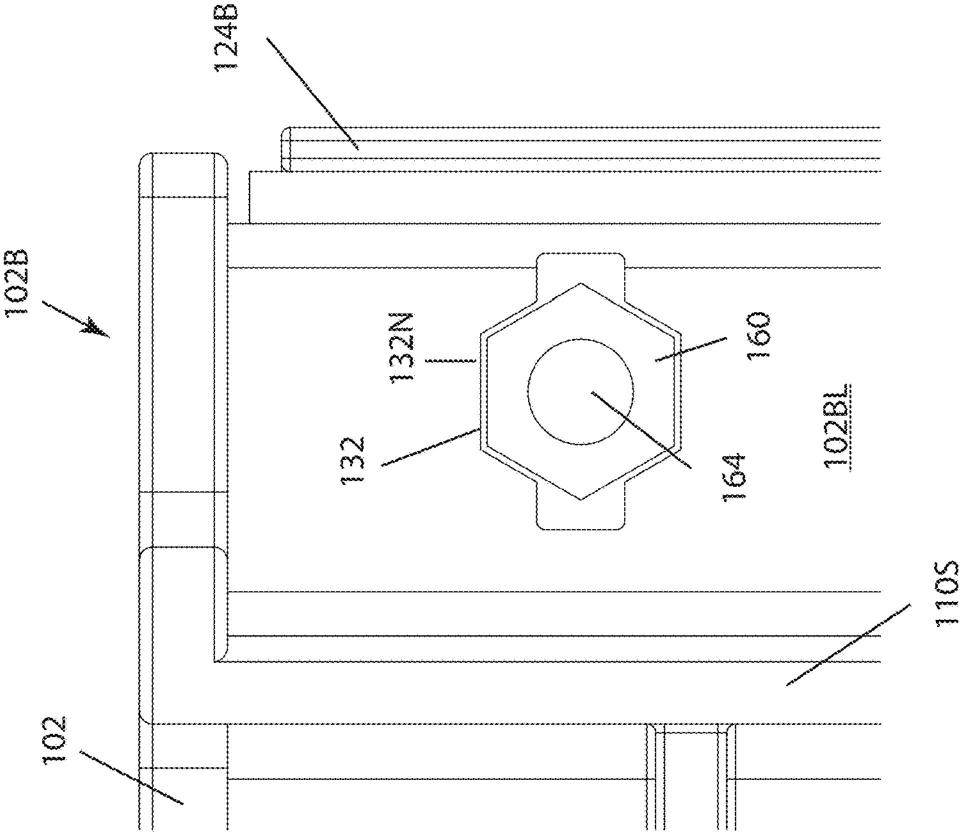
FIG. 6B is a partial bottom view of the end of the pushblock pad cleaner of FIG. 6A.
Figure 6A:
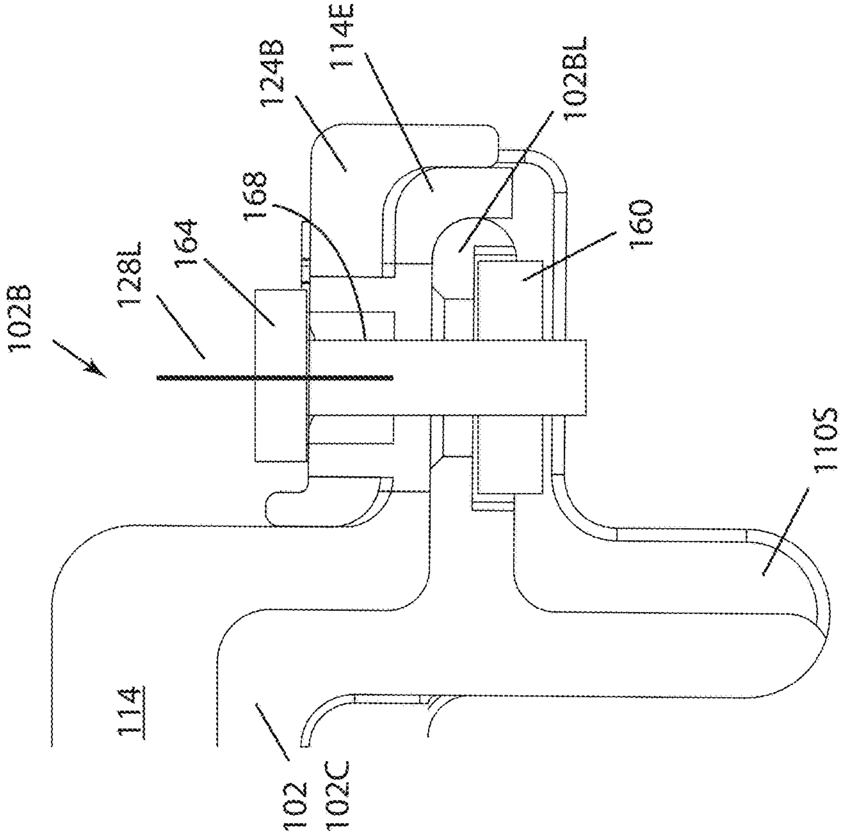
FIG. 6A is a partial sectional view of an end of the pushblock pad cleaner of FIG. 1A after being reconfigured.

FIG. 6A is a partial sectional view of an end of the pushblock pad cleaner 100 after being reconfigured. FIG. 6B is a partial bottom view of the body end 102B of the reconfigured pushblock pad cleaner 100. The securing plate 124B is designed in a way that permits being reconfigured to use a nut 160 and bolt 164 to secure the securing plate 124B to the ledge 102BL. This feature is advantageous for those who may prefer a nut 160 and bolt 164 over a resilient retaining clip 128. Moreover, should the resilient retaining clip 128 break after many assembly and disassembly cycles, the securing plate 124B can simply be reconfigured for continued use. This avoids the time and expense associated with procuring a replacement securing plate 124B.

Reconfiguring the securing plate 124B is as simple as removing the prongs 128P1, 128P2 and drilling a fastener hole 168 (e.g., ¼ inch diameter) through the securing plate 124B and concentric with the long axis 128L of the resilient retaining clip 128. The bolt 164 (e.g., ¼ inch bolt) is then passed through the fastener hole 168 and secured to the nut 160.

The underside of the through-hole 132 (on the side of the ledge 102BL opposite the securing plate 124B) optionally further includes a nut recess 132N that has a hex shape configured to receive therein and to match a shape of the nut 160 (e.g., a ¼ inch nut). The nut recess 132N may eliminate the need to use a wrench to hold the nut 160 to prevent the nut 160 from turning when the bolt 164 is tightened.

Figure 7A:
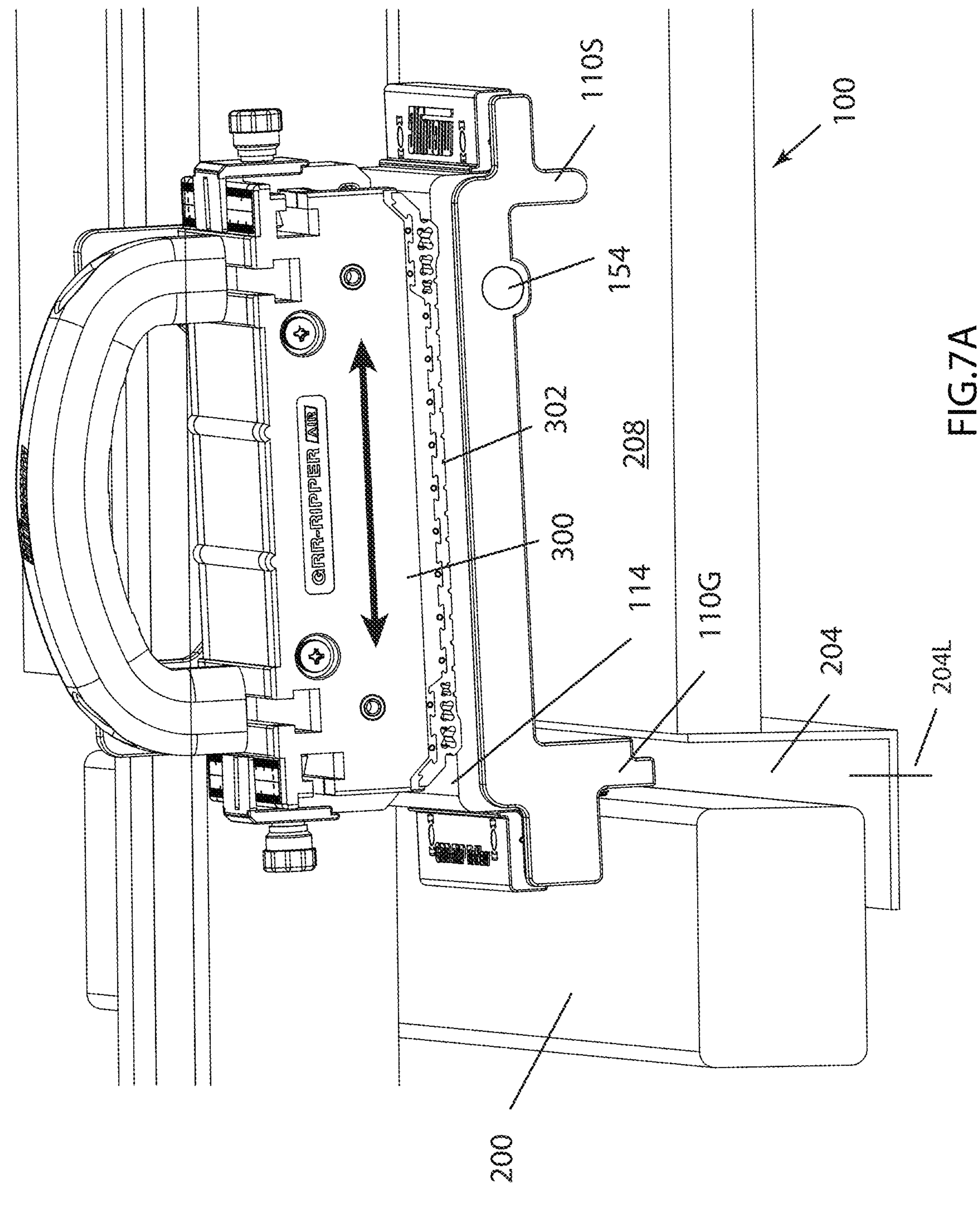
FIG. 7A and FIG. 7B are perspective views of the pushblock pad cleaner of FIG. 1A being used in one application.
Figure 7B:
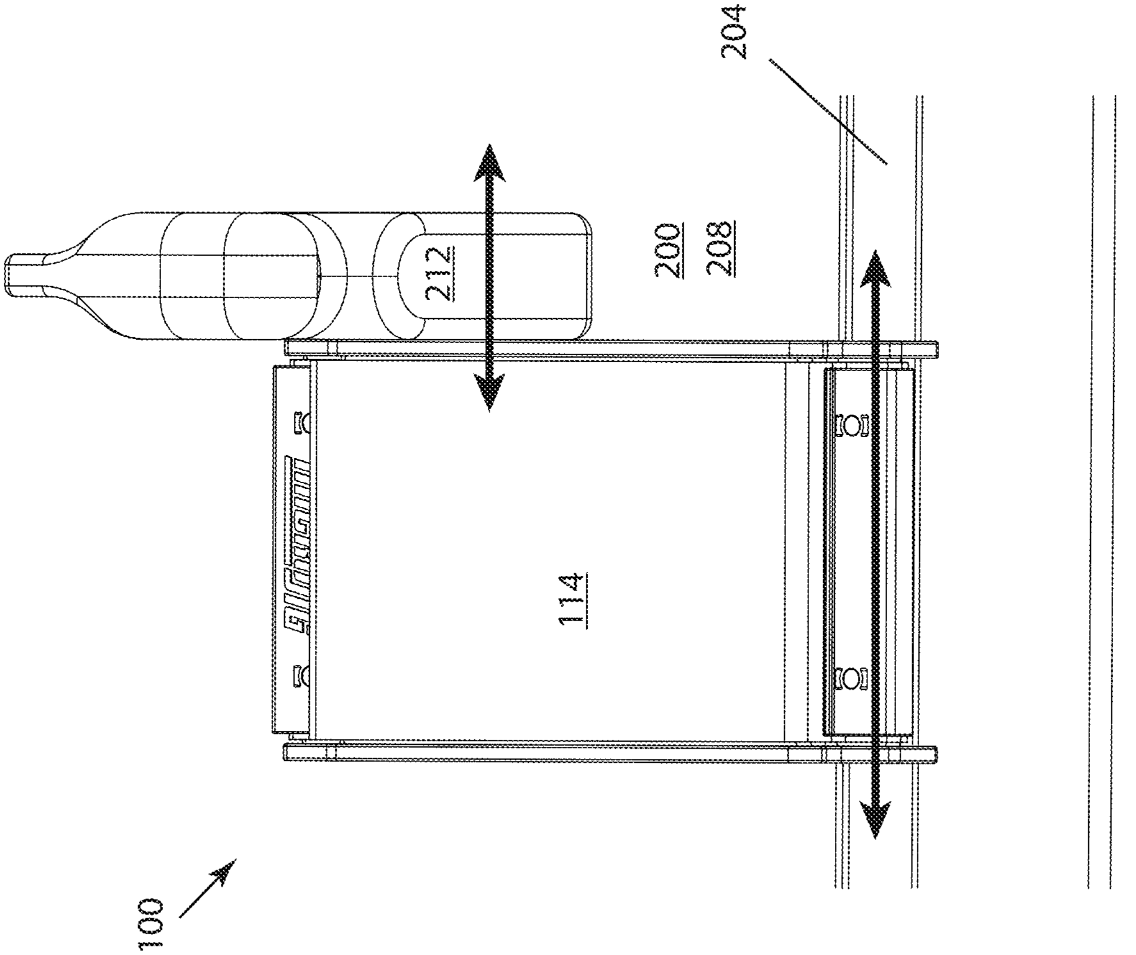

FIG. 7A and FIG. 7B are perspective views of the pushblock pad cleaner 100 being used with a table saw 200. In this application, the guide support 110G is disposed in the table saw slot 204 and the adjustment elements 112 (not visible) are adjusted to create a desired sliding fit between the guide support 110G and the table saw slot 204. This places the second support 110S on a work surface 208 of the table saw 200 and optionally holds the body central section 102C and associated pad central region 114C at a convenient (non-zero) angle relative to the (horizontal) work surface 208.

In operation, the pushblock 300 is placed so that the pad 302 of the pushblock contacts the scour pad 114. The pushblock is then moved as shown by the arrow in FIG. 7A until the pad 302 is cleaned to a desired degree. The solvent may be applied to the scour pad 114 prior to cleaning to aid the cleaning process.

The pushblock pad cleaner 100 can also be moved laterally in the table saw slot 204 along a long axis 204L of the table saw slot 204 as shown by the arrow in FIG. 7B. As the guide support 110G slides in the table saw slot 204, the second support 110S slides across the work surface 208. Also shown is a bottle 212 holding a solvent. The magnetic element 158 (not visible) is secured (e.g., adhered) to the bottle 212 at a location on the bottle 212 that corresponds with the location of the magnet 154 on the pushblock pad cleaner 100. When the magnetic element 158 is magnetically secured to the magnet 154, the bottle 212 can move across the work surface 208 with the pushblock pad cleaner 100 as shown by the arrow as the pushblock pad cleaner 100 is moved laterally. This ensures easy and reliable access to solvent that may be applied to the scour pad 114.

Figure 8:
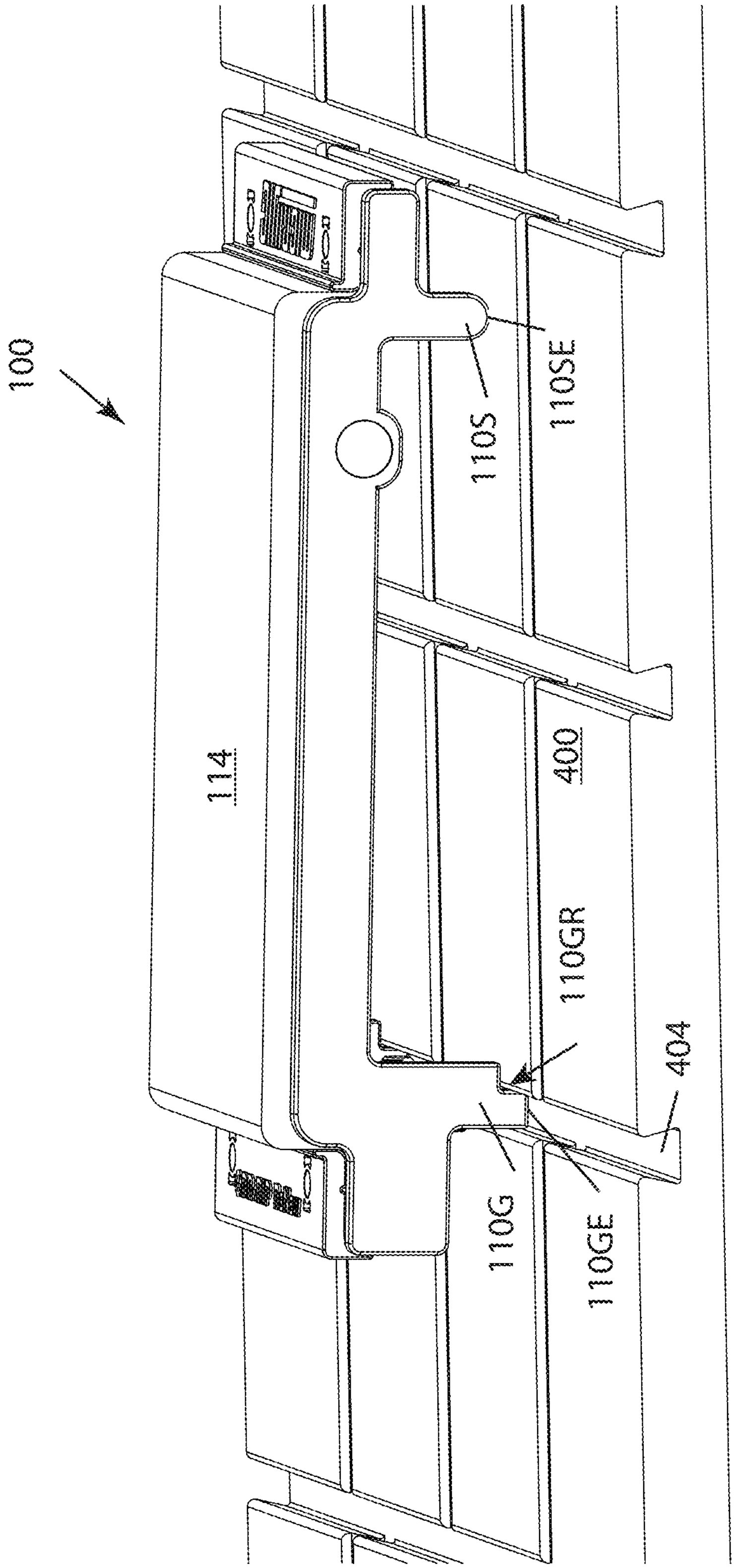
FIG. 8 is a perspective view of the pushblock pad cleaner of FIG. 1A being used in a different application.

FIG. 8 is a perspective view of the pushblock pad cleaner 100 being used on a work surface 400 having an array of dovetail slots 404 recessed therein. The dovetail slots 404 may be formed, for example, by a conventional ½ inch dovetail slot with a 14-degree side taper.

Distal ends 110GE, 110SE of the guide support 110G and the second support 110S respectively are configured to rest atop surfaces like the work surface 208 of the table saw or the work surface 400. One or both of the distal ends 110GE, 110SE may be further configured to at least partially seat in the dovetail slots 404. Distal end 110GE has a flat bitter end and is slightly tapered (e.g., via relief 110GR) so that it only partially seats in the dovetail slot 404. Alternately, distal end 110GE could be narrowed so that it fully seats on the bottom of the dovetail slot 404. Distal end 110SE is rounded so that it would likewise only partially seat in the dovetail slot. The configurations of the distal ends 110GE, 110SE can be configured in any combination of configurations disclosed herein as well as other configurations known to the artisan and suitable to achieve the at least partial seating in the dovetail slot 404 or any other desired slot.

Figure 9:
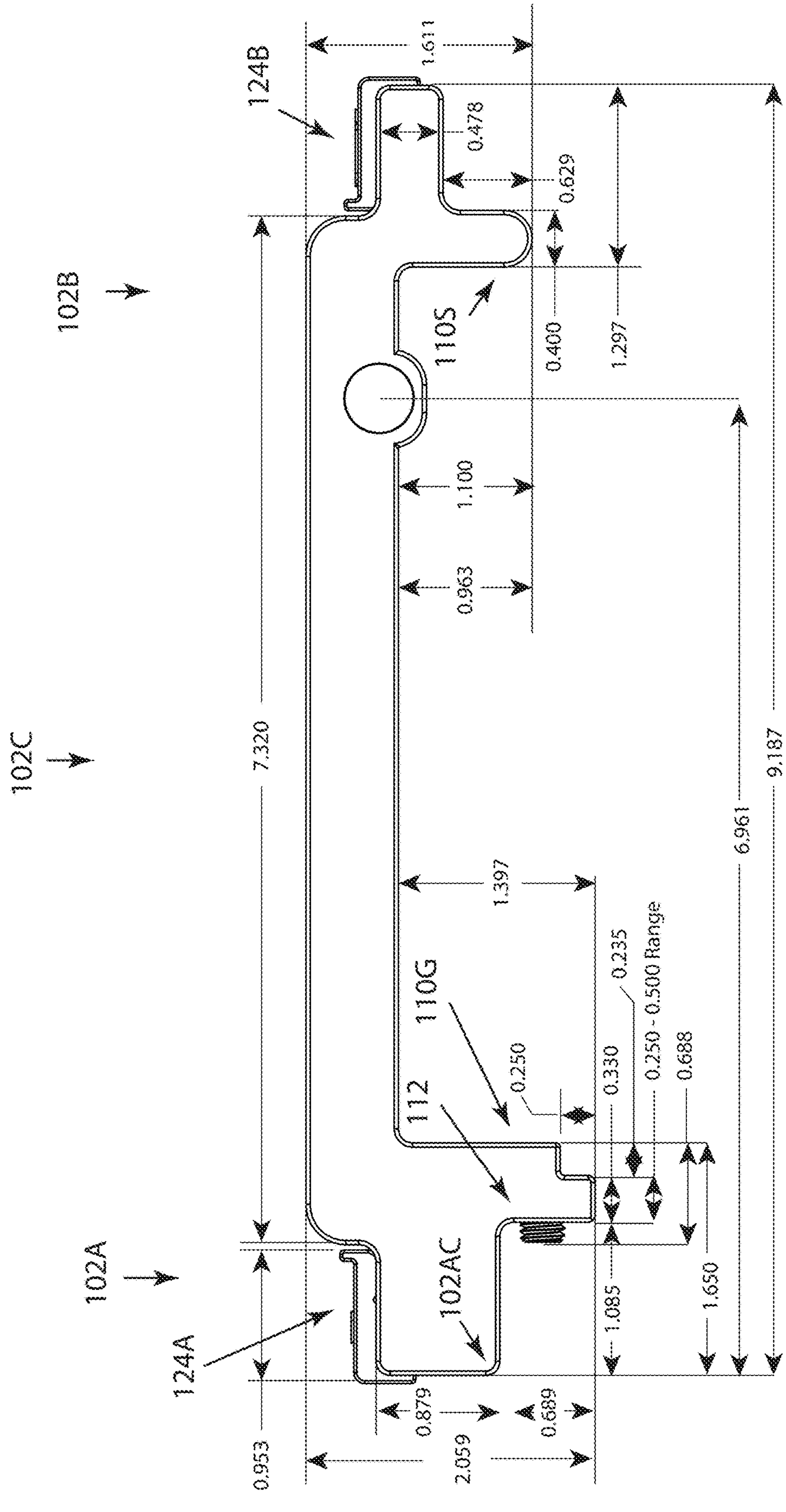
FIG. 9 is a side view showing a set of dimensions for the pushblock pad cleaner of FIG. 1A.

FIG. 9 is a side view showing a non-limiting set of dimensions for the example embodiment of the pushblock pad cleaner 100. This set of dimensions is chosen because they are suitable for use with a standard cabinet table saw fence. A nonlimiting example of a standard cabinet table saw fence includes the Besemeyer® fence system manufactured by Delta Power Equipment Corporation of Milwaukee Wisconsin and ubiquitous in the field. Other compatible standard cabinet table saw fences are known to those in the field.

Figure 10:
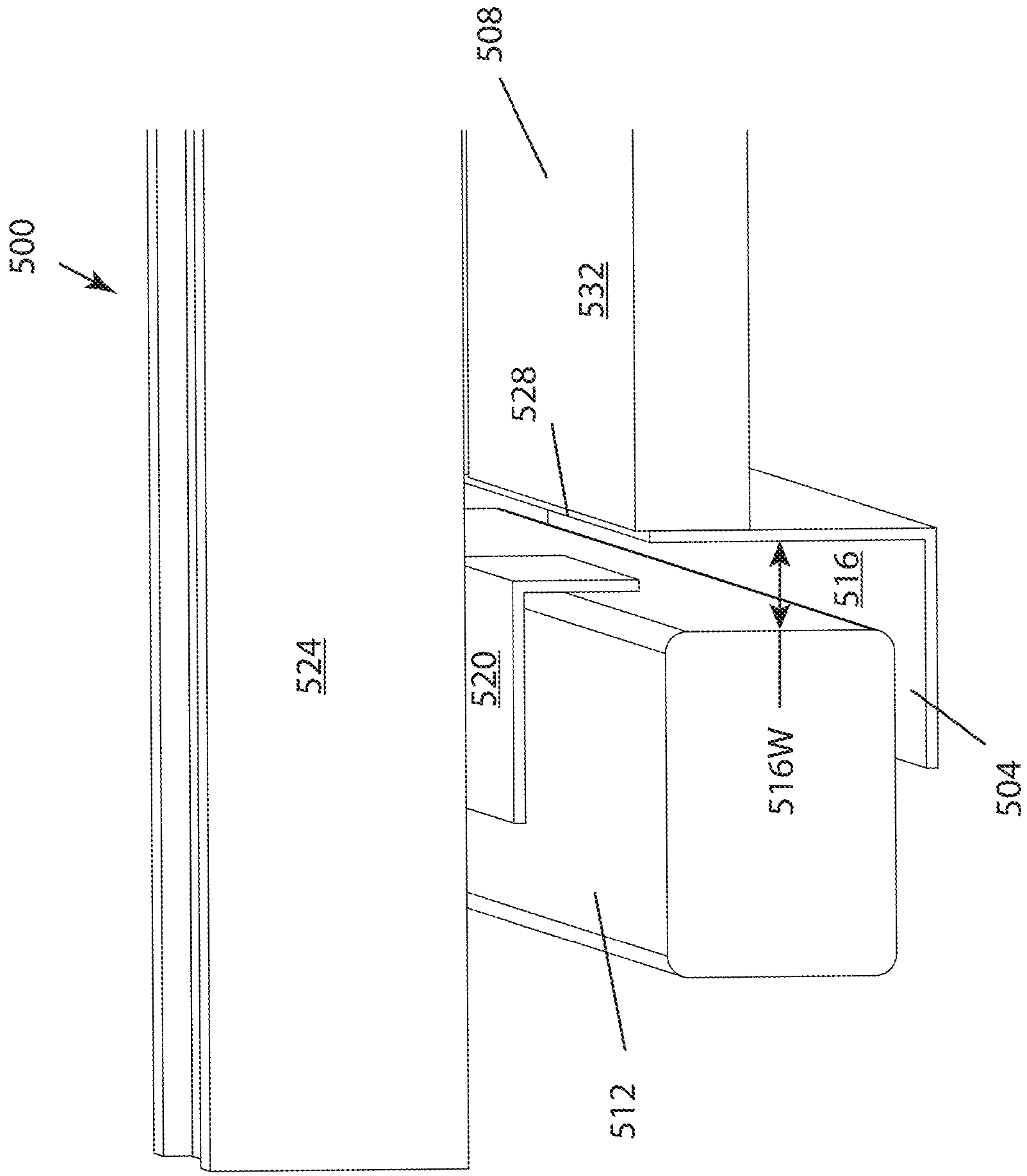
FIG. 10 is a perspective view of a standard cabinet saw fence having a slot with which the pushblock pad cleaner of FIG. 1A cooperates.

FIG. 10 shows the standard cabinet table saw fence assembly 500. The standard cabinet table saw fence assembly 500 includes an L-shaped rail 504 that secures to the worktable 508. A square rail 512 is secured to the L-shaped rail 504 and is adjustable from left to right as shown by the arrow that is superimposed on the square rail 512. The L-shaped rail and the square rail 512 define a slot 516. An angle bracket 520 of a fence assembly 524 slides along the slot 516 (in and out of the page as shown in FIG. 10). A width 516W of the slot varies depending on the selected position for the (adjustable) L-shaped rail 504.

As can be best seen with reference to FIG. 7A, FIG. 9, and FIG. 10, the adjustment elements 112 exist to account for the different slot widths 516W made possible by the adjustable positioning of the square rail 512. Example widths 516W range from 0.5 inches to 1.0 inches. The vertical length dimensions of the guide support 110G have been selected to ensure the body central section 102C clears corner 528. The location along the X-axis 106X and vertical dimension of the second support 110S have been selected to provide a suitably sized body central section 102C that is (optionally) disposed at a nonzero tilt angle relative to a (horizontal) work surface 532 of the worktable 508. The tilt angle may be, for example, 5° to 10° up from the guide support 110G to the second support 110S. Common height differences between the work surface 532 and the top of the square rail 512 range from 0.125 inches to 0.5 inches.

The location along the X-axis 106X and a vertical location of the magnet 154 are selected to ensure the magnet is disposed over the work surface 532 far enough from the corner 528 and at a vertical location suitable to push and pull the bottle 212 without tending to topple the bottle 212. The corner 102AC is optionally configured so that it rests on the square rail 512. The location of the corner 102AC, in turn, controls how far into the slot 516 the guide support 110G reaches. Consequently, the corner 102AC is selected to ensure the guide support sits in the slot 516 a selected distance. The location of the corner 102AC and the location of the adjustment elements 112 may depend on each other to ensure the proper seat depth of the guide support 110G and an associated proper location for the adjustment elements 112. The relief 110GR may be configured to enable the guide support 110G to seat in the slot 516 at an angle as shown without contacting the L-shaped rail 504. Various other dimensions of the pushblock pad cleaner 100 are selected to achieve the functions disclosed herein. However, the disclosed dimensions are not meant to be limiting and other dimensions that achieve the disclosed functions are within the scope of the disclosure.

As has been disclosed above, the present inventor has devised an apparatus with features that are improvements in the art. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A pushblock pad cleaner, comprising:

a body comprising a body central section comprising a central section upside surface configured to receive a scour pad thereon and body ends disposed opposite each other about the body central section;

at least one clamp assembly, each disposed at a respective body end and each configured to secure a respective end of the scour pad and thereby hold a central region of the scour pad atop the body central section, wherein each clamp assembly comprises a ledge of the respective body end, wherein each ledge comprises a respective ledge upside surface on which the respective end of the scour pad rests, and wherein the ledge upside surfaces are lowered relative to the central section upside surface;

a guide support disposed at one body end of the body ends;

a second support at another end of the body ends;

wherein the guide support is configured to register with a table saw slot to enable the guide support to slide along a long axis of the table saw slot while the second support slides along a work surface of the table saw;

wherein each clamp assembly comprises a securing plate configured to be secured to a respective ledge atop the respective ledge upside surface and to clamp the respective end of the scour pad between the securing plate and the respective ledge upside surface;

wherein each securing plate is disposed below the central section upside surface, wherein each ledge comprises a respective through-hole; and wherein each securing plate comprises a resilient retaining clip configured to snap into the respective through-hole to secure the securing plate to the respective ledge or comprises a fastener hole configured to align with the respective through-hole and to permit a fastener to secure the securing plate to the respective ledge.

2. The pushblock pad cleaner of claim 1, wherein the guide support comprises a distal end that is configured to abut the work surface; and wherein the distal end is tapered and configured to at least partly seat in a slot formed by a ½ inch 14 degree dovetail router bit.

3. The pushblock pad cleaner of claim 1, wherein the guide support comprises an adjustment element configured to remove slack between the table saw slot and the guide support.

4. The pushblock pad cleaner of claim 1, wherein an underside of the through-hole opposite the securing plate comprises retaining clip relief notches configured to provide access to squeeze the resilient retaining clip and thereby release the resilient retaining clip from the respective ledge.

5. The pushblock pad cleaner of claim 1, wherein an underside of through-hole opposite the securing plate comprises a nut recess configured to receive a nut of a nut and fastener therein.

6. The pushblock pad cleaner of claim 1, wherein the securing plate is secured to the respective ledge via the resilient retaining clip in the through-hole.

7. The pushblock pad cleaner of claim 6, wherein upon an application of an external force the ledge is configured to enable movement of the securing plate toward the body central section against a resilience of the resilient retaining clip when the resilient retaining clip is disposed in the through-hole; and wherein upon sufficient movement of the securing plate toward the body central section, the resilient retaining clip is squeezed enough to permit the resilient retaining clip to be rotated out of the through-hole, thereby releasing the securing plate from the ledge.

8. The pushblock pad cleaner of claim 1, further comprising:

a magnet disposed in a side of the body; and wherein when the guide support is disposed in the table saw slot, the magnet is configured to be disposed above the work surface.

9. A pushblock pad cleaner, comprising:

a body comprising a body central section configured to receive a scour pad thereon and body ends disposed opposite each other about the body central section;

a clamp assembly at each body end, each comprising a ledge of the respective body end and a securing plate, wherein each ledge is lowered relative to the central body section;

wherein the securing plate is configured to clamp a respective end of the scour pad between the securing plate and the ledge to thereby hold a central region of the scour pad atop the body central section;

wherein the ledge comprises a through-hole; and wherein the securing plate comprises a resilient retaining clip configured to snap into the through-hole to secure the securing plate to the ledge or comprises a fastener hole configured to align with the respective through-hole and to permit a fastener to secure the securing plate to the respective ledge.

10. The pushblock pad cleaner of claim 9, further comprising a guide support disposed at one body end of the body ends and a second support at another end of the body ends; and wherein the guide support is configured to register with a table saw slot to enable the guide support to slide along a long axis of the table saw slot while the second support slides along a work surface of the table saw.

11. The pushblock pad cleaner of claim 10, wherein the guide support comprises an adjustment element configured to remove slack between the table saw slot and the guide support.

12. The pushblock pad cleaner of claim 10, further comprising:

a magnet disposed in a side of the body;

a ferrous element comprising an adhesive; and wherein when the guide support is disposed in the table saw slot, the magnet is configured to be disposed above the work surface.

13. The pushblock pad cleaner of claim 9, wherein an underside of the through-hole opposite the securing plate comprises retaining clip relief notches configured to provide access to squeeze the resilient retaining clip and thereby release the resilient retaining clip from the ledge.

14. The pushblock pad cleaner of claim 13, wherein upon an application of an external force the ledge is configured to enable movement of the securing plate toward the body central section against a resilience of the resilient retaining clip when the resilient retaining clip is disposed in the through-hole; and wherein upon sufficient movement of the securing plate toward the body central section, the resilient retaining clip is squeezed enough to permit the resilient retaining clip to be rotated out of the through-hole, thereby releasing the securing plate from the ledge.

15. A pushblock pad cleaner, comprising:

a body comprising a body central section configured to receive a scour pad thereon and body ends disposed opposite each other about the body central section;

a clamp assembly at each body end, each comprising a ledge of the respective body end and a securing plate, wherein each ledge is lowered relative to the central body section;

wherein the securing plate is configured to clamp a respective end of the scour pad between the securing plate and the ledge to thereby hold a central region of the scour pad atop the body central section;

wherein the ledge comprises a through-hole; and wherein the securing plate comprises a resilient retaining clip configured to snap into the through-hole to secure the securing plate to the ledge.

* * * * *